(12) United States Patent
Wang et al.

(10) Patent No.: US 11,338,399 B2
(45) Date of Patent: May 24, 2022

(54) PRODUCTION METHOD OF BATHROOM HARDWARE SHELLS

(71) Applicant: Beijing Kohler Ltd., Beijing (CN)

(72) Inventors: Xiaojun Wang, Beijing (CN);
Zhaoyang Cheng, Beijing (CN);
Junhui Zhang, Beijing (CN)

(73) Assignee: BEIJING KOHLER LTD., Beijing (CN)

( * ) Notice: Subject to any disclaimer, the term of this patent is extended or adjusted under 35 U.S.C. 154(b) by 806 days.

(21) Appl. No.: 16/142,128

(22) Filed: Sep. 26, 2018

(65) Prior Publication Data
US 2019/0099846 A1 Apr. 4, 2019

(30) Foreign Application Priority Data
Sep. 29, 2017 (CN) .......................... 201710906305.2

(51) Int. Cl.
*B23P 15/00* (2006.01)
*B21C 35/02* (2006.01)
(Continued)

(52) U.S. Cl.
CPC .......... *B23P 15/001* (2013.01); *B21C 35/023* (2013.01); *B21D 26/049* (2013.01);
(Continued)

(58) Field of Classification Search
CPC ... B23P 15/001; B21C 35/023; B21D 26/049; B21D 26/055; B21D 51/42; B21K 1/24;
(Continued)

(56) References Cited

U.S. PATENT DOCUMENTS 1,993,361 A * 3/1935 Cornell, Jr. .............. B21D 9/03
72/133
2,243,809 A 5/1941 Wendel
(Continued)

FOREIGN PATENT DOCUMENTS

| CN | 106623580 | 5/2017 |
| CN | 106881393 | 6/2017 |
| DE | 202015102899 | 10/2015 |

OTHER PUBLICATIONS

European Search Report re: EP18196726 dated Feb. 27, 2019; 5 pages.

*Primary Examiner* — Sarang Afzali
(74) *Attorney, Agent, or Firm* — Foley & Lardner LLP

(57) ABSTRACT

A method that includes heating a bar having an outer diameter and a length to a first temperature for a first time; extruding the heated bar to form a hollow blank having a wall thickness; forming a semi-finished blank by closing one end; bending the semi-finished blank to have an angle between first and second parts of the semi-finished blank; placing the bent semi-finished blank in a die, which is heated to a second temperature; forming a shell by injecting a gas onto or into the bent semi-finished blank after closing the die through a gas inlet in the die at a pressure for a second time, which causes the bent semi-finished blank to fit a cavity of the bathroom hardware shell shaping die; removing the shell from the die and forming a water faucet hole therein; and plating an outer surface of the shell with a coating.

18 Claims, 3 Drawing Sheets

(51) Int. Cl.
*B21D 26/049* (2011.01)
*E03C 1/04* (2006.01)
*B21D 26/055* (2011.01)
*B21K 1/24* (2006.01)

(52) U.S. Cl.
CPC .............. *B21D 26/055* (2013.01); *B21K 1/24* (2013.01); *B23P 15/00* (2013.01); *E03C 1/0404* (2013.01); *Y10T 29/4943* (2015.01)

(58) Field of Classification Search
CPC ........... Y10T 29/4943; Y10T 29/49444; Y10T 29/5185
See application file for complete search history.

(56) References Cited

U.S. PATENT DOCUMENTS

| | | | |
|---|---|---|---|
| 3,681,960 A | | 8/1972 | Tadokoro |
| 3,961,513 A | | 6/1976 | Stahly |
| 4,414,834 A | * | 11/1983 | Gratzer ................ B21D 17/025 29/421.1 |
| 4,841,760 A | * | 6/1989 | Ferguson ................ B21D 9/12 72/133 |
| 5,165,168 A | | 11/1992 | Higgins et al. |
| 5,170,557 A | * | 12/1992 | Rigsby .................. B21C 37/154 138/148 |
| 6,202,460 B1 | * | 3/2001 | Gardon ................ B21C 37/294 72/58 |

* cited by examiner

PRODUCTION METHOD OF BATHROOM HARDWARE SHELLS

CROSS-REFERENCE TO RELATED PATENT APPLICATIONS

The present application claims priority to and the benefits of Chinese Patent Application No. 201710906305.2, filed on Sep. 29, 2017, which is incorporated by reference herein in its entirety.

BACKGROUND

This application relates to a method of producing hardware shells for use in bathroom and kitchen fixtures. More specifically, this application relates to a method of shaping hardware shells into faucets, such as bathroom faucets, kitchen faucets, basin faucets, shower faucets, and bathtub faucets.

SUMMARY

A purpose of the methods described herein is to produce bathroom or kitchen hardware (e.g., faucet) shells using a plastic shaping method that solves problems in gravity casting and pressure casting while producing no waste gas and solid waste.

At least one embodiment of the present application relates to a method of producing bathroom hardware shells that includes providing a bar having an outer diameter and a length; heating the bar to a first temperature for a first time; extruding the heated bar to form a hollow blank having a substantially uniform wall thickness; forming a semi-finished blank by closing one end of the hollow blank; bending the semi-finished blank to have an angle between first and second parts of the semi-finished blank; placing the bent semi-finished blank in a bathroom hardware shell shaping die, wherein the bathroom hardware shell shaping die is heated to a second temperature; forming a shell by injecting a gas onto or into the bent semi-finished blank after closing the bathroom hardware shell shaping die through a gas inlet in the bathroom hardware shell shaping die at a pressure for a second time, which causes the bent semi-finished blank to fit a cavity of the bathroom hardware shell shaping die; removing the shell from the bathroom hardware shell shaping die and forming a water faucet hole therein; and plating an outer surface of the shell with a coating.

At least one embodiment of this application relates to a method of producing a faucet shell that includes heating a bar to a first temperature for a first time, the bar having an outer shape and a length; forming a hollow blank having a wall thickness by extruding the bar after heating the bar to the first temperature for the first time; forming a semi-finished blank by closing one end of the hollow blank; forming a bent semi-finished blank by bending first and second parts of the semi-finished blank at an angle relative to one another; forming a shell by injecting a gas comprising at least one of argon and nitrogen onto or into the bent semi-finished blank in a bathroom hardware shell shaping die heated to a second temperature, wherein the gas is injected at a pressure for a second time, which causes the bent semi-finished blank to fit a cavity of the bathroom hardware shell shaping die; and forming a water faucet hole in the shell At least one embodiment of this application relates to a method of producing a kitchen or bathroom shell through a ten step process. Step S10 (e.g., "blank production") involves casting and extruding raw materials into bars or purchasing shaped materials, where the bars or purchased shaped materials have a diameter of about 25-65 mm. Step S20 (e.g., "blank cutting") involves cutting the prepared blank or purchased shaped materials into the blank with a length of about 50-500 mm. Step S30 (e.g., "blank rough shaping") involves preheating the blank prepared in step S20 for about 1.5-2.5 hours at about 200-450° C.; putting the heated blank into an extrusion die to extrude it into the hollowed-out blank of uniform thickness, where one end of the hollowed-out blank is closed; the outer diameter is about 25-65 mm; and the inner diameter is about 10-55 mm. Step S40 (e.g., "blank preliminary shaping") involves putting the hollowed-out blank prepared in step S30 on a die; extruding the blank with an extrusion head to form a semi-finished blank; lathing any external rough edges with a lathe; preserving the heat of the semi-finished blank for about 30 minutes at about 150-400° C.; bending the semi-finished blank with a pipe bender, such that the semi-finished blank has an included angle of about 0-170° after bending; polishing any folds on the bent semi-finished blank with a 180-mesh sanding belt; and polishing with a 400-mesh sanding belt after fold removal. Step S50 (e.g., "blank net shaping") involves putting the bent semi-finished blank prepared in step S40 in a super-plastic shaping die; heating the super-plastic shaping die to about 200-450° C.; closing the super-plastic shaping die; closing the air seal device; and slowly injecting a gas (e.g., argon) into the semi-finished blank through the air inlet at about 0.1-10 MPa, until the shell of the semi-finished blank fits the cavity of the bathroom hardware shell die, where the duration of shaping is about 3-35 minutes to produce a semi-finished product. Step S60 (e.g., "riser removal") involves removing the riser of the semi-finished product prepared in step S50, such as with a lathe. Step S65 (e.g., "connecting") involves connecting the semi-finished product to a metal base after removing the riser in step S60. Step S70 (e.g., "mechanical processing") involves making a hole having a diameter of about 8-35 mm at the position corresponding to the water faucet on the semi-finished product whose riser is removed in step S60. Step S80 (e.g., "polishing") involves sanding the semi-finished product from step S70 with 180-mesh, 400-mesh, and/or 600-mesh sanding belts and/or cleaning with a cloth wheel. Step S90 (e.g., "surface treatment") involves plating at least one of a copper coat, a nickel coat, and a chromium coat on the polished semi-finished product from step S80 by water-plating, where the thickness of the copper coat if provided is about 15-30 μm, the thickness of the nickel coat if provided is about 10-25 μm; and the thickness of the chromium coat if provided is about 0.1-0.4 μml.

As examples, the raw materials can include a zinc alloy, a zinc-aluminum alloy, and/or an aluminum alloy.

As examples, the cross section of the bar can be a circle, an oval, a quadrangle, a polygon with or without a cambered surface.

Alternatively, the argon can be replaced with another gas, such as nitrogen alone or in combination with air or with other media transmitting pressure.

As an example, injecting the gas (e.g., argon) may include firstly injecting gas at a pressure of about 0.1-2 Mpa for a time of about 2-8 minutes, secondly injecting gas at a pressure of about 0.5-5 Mpa for a time of about 2-15 minutes; and thirdly injecting gas at a pressure of about 0.8-10 Mpa for a time of about 3-25 minutes.

As examples, the methods described herein advantageously produce bathroom and kitchen hardware shells having zinc alloys without pollution gas and solid waste emissions, while solving problems associated with unworkable core-pulling and shaping of large zinc alloy parts. The methods described herein also produce high-quality surfaces, avoiding subsequent expensive and time consuming mechanical processing, such as polishing, thereby increasing yield of finished products.

DETAILED DESCRIPTION

Kitchen and bathroom hardware products (e.g., shells, casings, bodies, etc.) can include copper alloys, zinc alloys, aluminum alloys, stainless steel, etc., with copper alloys and zinc alloys used more frequently and widely. However, the traditional shaping (e.g., forming) method for these types of parts (e.g., cavity parts) is casting. Casting typically involves complex processes and high process temperatures, which are less controllable. Also, casting often produces various casting defects, consumes a relative high amount of energy, and produces a relative high amount of pollution. Particularly, whether made by gravity casting or pressure casting, zinc alloy materials volatilize and oxidize relatively easily in high-temperature melting with a relatively low yield. Metal waste and solid waste produced in casting pollute the environment. Further, casting is unable to produce thin-wall parts or non-open bathroom products whose cores cannot be pulled; and as more environmental restrictions are issued, it's urgent to develop a new shaping technology to replace the traditional casting technology. In view of these factors, finding an alternative process (to casting) for forming kitchen and bathroom hardware products would be beneficial to manufacturing and the environment.

Generally referring to the FIGURES, disclosed herein are methods for producing such kitchen and bathroom hardware products that address the issues mentioned above. The methods and technical solutions associated therewith are further explained in combination with the embodiments and figures.

Embodiment 1

Figure 9:
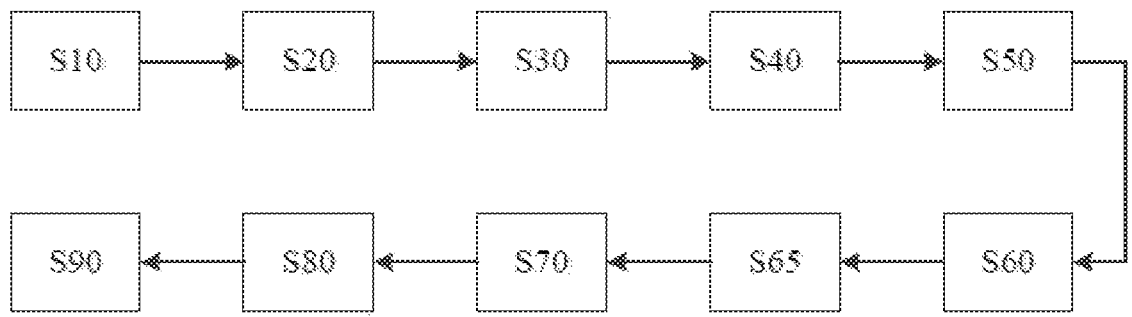
FIG. 9 is a flow diagram of an exemplary embodiment of a method of producing a kitchen or bathroom shell, according to this application.

FIG. 9 illustrates an embodiment of a method of producing kitchen and bathroom hardware shells including ten steps. Although the steps may be described below sequentially and/or using sequential terms (e.g., first, second, third, etc.), the order of the steps can be modified (e.g., reduced, rearranged, switched, etc.) according to one of skill in the art of manufacturing kitchen and bathroom hardware shells. For example, Steps S10 and S20 can be eliminated, such as through purchasing bars for use starting in Step S30.

Step S10 (e.g., first step, "blank production," etc.) involves providing (e.g., producing, purchasing, etc.) blanks of material (e.g., zinc alloy, copper alloy, aluminum alloy, zinc-aluminum alloy, etc.) for use in making the kitchen/bathroom hardware products (hereafter "shells"). The blanks can be purchased or made through any suitable process (e.g., casting, extruding, etc.) utilizing raw materials having the desired shape/configuration (e.g., circle, oval, quadrangle, square, polygon, irregular shape, etc.). For example, the blanks can be formed into bars (e.g., solid bars) having a diameter of 25~65 mm (e.g., 35 mm) containing a zinc alloy, such as ZnAl5 having a tensile strength of about 280-380 Mpa, a yield strength of 260~310 Mpa, and an elongation of 4~9%. As used herein, the term about denotes a reasonable tolerance appreciated by one of skill in the art (e.g., +/−5%).

Step S20 (e.g., second step, "blank cutting," etc.) involves providing a bar/blank having an outer shape (e.g., circle, oval, quadrangle, square, polygon, irregular shape, etc.) and a length. The blank/bar is cut (e.g., trimmed) to a length, for example, of 50~500 mm. It is noted that the cutting method is not limited to physical cutting or chemical cutting. For example, a zinc alloy blank prepared in step S10 (e.g., zinc alloy bars or purchased shaped materials) can be cut on a saw machine (e.g., WEIYE saw machine), such as at 30 m/min to a length of 50~500 mm (e.g., about 165 mm) for the cut blank.

Figure 1:
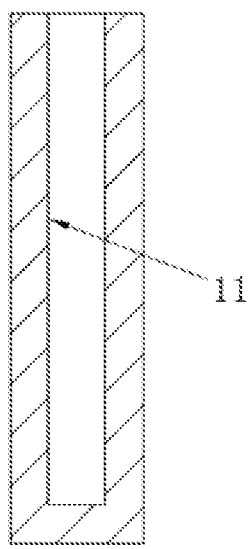
FIG. 1 is a cross sectional view of an extruded blank, according to this application.

Step S30 (e.g., third step, "blank rough shaping," etc.) involves preheating a bar/blank (e.g., the trimmed blank prepared in S20) for 1.5~2.5 hours at 200~450° C.; putting the heated bar/blank into an extrusion die, such as where an outer diameter of the extrusion die is 60~120 mm (e.g., 80 mm) and an inner diameter is 25~65 mm (e.g., 35 mm); and extruding the bar/blank into the hollowed-out blank of uniform thickness. One end of the hollowed-out blank is closed, the outer diameter is 25~65 mm (e.g., 35 mm), and the inner diameter is 10~55 mm (e.g., 25 mm). The hollowed-out blank may have an uneven wall thickness, such as where the wall thickness can range from 1.0 mm to 12 mm (e.g., 5.5 mm). The hollowed-out blank may have two open ends. FIG. 1 illustrates a structure of an example of an extruded blank.

Step S40 (e.g., fourth step, "blank preliminary shaping," etc.) involves putting the hollowed-out blank prepared in step S30 on the die; extruding the blank with the extrusion head to form a semi-finished blank; and/or lathing the external rough edges with a lathe. This or another step can include preserving the heat of the semi-finished blank for about 30 minutes at about 150~400° C. (e.g., 390° C.); bending the semi-finished blank with a pipe bender; after bending, the semi-finished blank has an included angle of 0~170° (e.g., 90°), particularly at 15~165° C.; polishing folds on the bent semi-finished blank (e.g., with a 180-mesh sanding belt); and/or polishing (e.g., with a 400-mesh sanding belt) after fold removal; where the rotational speed or frequency of the belt sander is in a range of 1500~2500 rpm.

Figure 2:
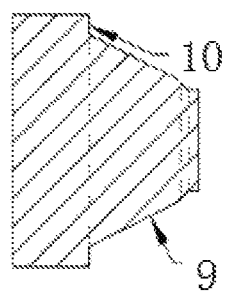
FIG. 2 is a cross sectional view of an extrusion head, according to this application.
Figure 3:
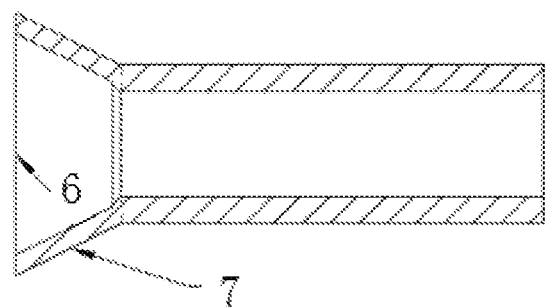
FIG. 3 is a cross sectional view of another extruded blank, according to this application.
Figure 4:
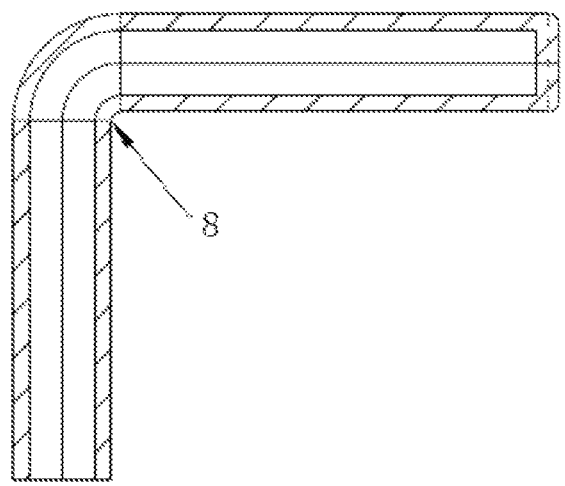
FIG. 4 is a cross sectional view of a bent blank, according to this application.

FIG. 2 illustrates an embodiment of the structure of the extrusion head. FIG. 3 illustrates an embodiment of the extruded blank. FIG. 4 illustrates an embodiment of the structure of the bent semi-finished blank. The bent blank can be shaped by one-time bending or multiple bending.

Step S50 (e.g., fifth step, "blank net shaping," etc.) involves putting the bent semi-finished blank prepared in step S40 in a super-plastic shaping die; heating the super-plastic shaping die to about 200~450° C.; closing the super-plastic shaping die; closing the air seal device; and/or slowly injecting argon into the semi-finished blank through the air inlet 3 at about 0.1 MPa~10 MPa, until the shell of the semi-finished blank fits the cavity of the bathroom hardware shell die. The duration of shaping can be about 3~35 minutes and after, the semi-finished product is thus produced. The argon can be replaced with nitrogen or air or with other media transmitting pressure.

Figure 5:
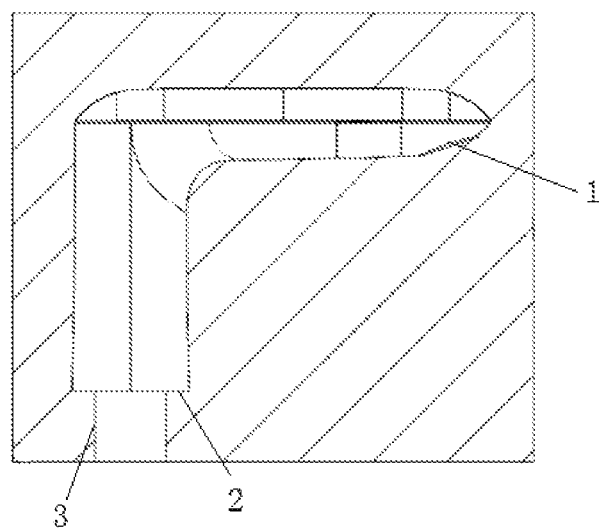
FIG. 5 is a cross sectional view of a super plastic shaping die, according to this application.

FIG. 5 illustrates the structure of the super-plastic shaping die, which includes an upper die and a lower die, where the upper die and the lower die combine to form a cavity, which is the structure of the bathroom hardware shell. The super-plastic shaping die also includes the structures corresponding to the water faucet 4 and the water inlet 5 of the bathroom hardware shell.

Figure 6:
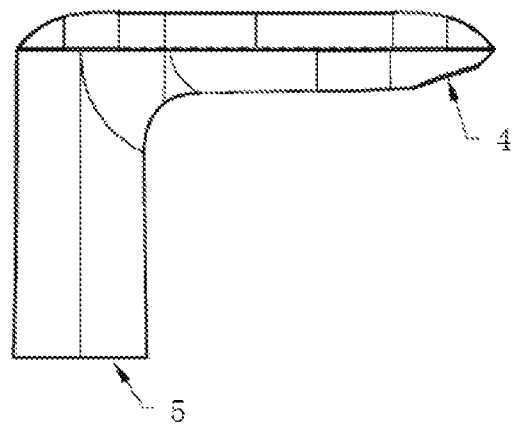
FIG. 6 is a side view of a bathroom hardware shell, according to this application.

Step S60 (e.g., sixth step, "riser removal," etc.) involves removing the riser (corresponding to the position of the water inlet) of the semi-finished product prepared in step S50 with, for example, a lathe, i.e., the part 5 shown in FIG. 6. It is noted that the processing precision is 0.05 mm, as an example.

Figure 8:
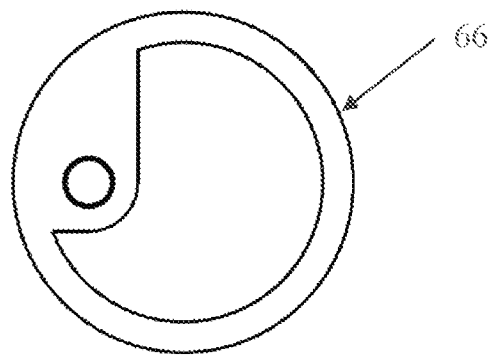
FIG. 8 is a cross sectional view of a metal base, according to this application.

Step S65 (e.g., seventh step, "connecting," etc.) involves connecting the semi-finished product, whose riser is removed in step S60, to the metal base, such as the metal base 66 shown in FIG. 8, to install and fix (e.g., couple) the bathroom hardware shell. By way of example, the method of connecting the metal can be, but is not limited to argon arc welding, laser welding, and braze welding.

Step S70 (e.g., eighth step, "mechanical processing," etc.) involves making a round hole having a diameter in a range of 24 mm to 28 mm at a position corresponding to the water faucet on the semi-finished product, whose riser is removed in step S60.

Step S80 (e.g., ninth step, "polishing," etc.) involves carrying out rough polishing, fine polishing and/or cleaning to the surface of the semi-finished product processed in step S70. That is, sanding the semi-finished product processed in step S70 with, for example, 180-mesh, 400-mesh and/or 600-mesh sanding belts, where the rotational speed or frequency of the sanding belt wheel is in a range of 1,500~2,500 rpm, and/or cleaning with a cloth wheel whose rotational speed or frequency is in a range of 1,500~2,500 rpm, such as, where the surface roughness of the part reaches Ra 2.0~0.5 μm.

Step S90 (e.g., tenth step, "surface treatment," etc.) involves plating a coat or coating (e.g., a copper coat, a nickel coat, a chromium coat, etc.) onto the semi-finished product polished in step S80, such as by water-plating. By way of example, the thickness of the copper coat is in a range of 15~30 μm; the thickness of the nickel coat is in a range of 10~25 μm; and the thickness of the chromium coat is in a range of 0.1~0.4 μm.

The methods of producing bathroom hardware shells disclosed herein can obtain zinc alloy bathroom hardware shells without pollution, gas emission, and solid waste emission, as well as solve problems in unworkable core-pulling and shaping of large zinc alloy parts. The methods are similar to net shaping, producing a high-quality surface, avoiding subsequent mechanical processing and long-time polishing and enhancing the utilization of raw materials and the yield of finished products. Thus, the methods are more environmental friendly shaping methods that can obtain bathroom product metal. That is, the methods of producing of bathroom hardware shells described herein can avoid emission of toxic gas and solid waste, which is a problem of gravity casting; can avoid toxic gas emission and shaping of products whose cores cannot be pulled, which are problems of pressure casting; reduce defects such as sand holes, pores, shrinkage porosity and cracks; and enhance the rate of finished products.

Embodiment 2

According to another embodiment, a method of producing bathroom hardware shells is provided, where the structure of the bathroom hardware shell in Embodiment 2 is different from that in Embodiment 1, and the method includes nine steps. FIG. 9 can be used to illustrate this embodiment as well with the reduction of Step S65.

Step S10 (e.g., first step, "blank production," etc.) involves forming blanks/bars of raw material, such as zinc alloy for use in bathroom hardware shells for example. This step can include casting and extruding raw materials (e.g., zinc alloy) into bars having a cross section shape (e.g., a circle, an oval, a quadrangle, a square, a polygon or an irregular shape). By way of example, the bars can have a diameter that is 25-65 mm (e.g., 50 mm) and include a zinc alloy, such as ZnAl5.

Step S20 (e.g., second step, "blank cutting," etc.) involves putting the zinc alloy blank prepared in step S10 (e.g., zinc alloy bars) on the saw machine (such as WEIYE saw machine) and cutting the zinc alloy bar (e.g., at a rate of 30 m/min) to length to product cut blanks having a length in a range of 50-500 mm (e.g., 250 mm).

Step S30 (e.g., third step, "blank rough shaping," etc.) involves preheating the blank prepared in step S20 for about 1.5~2.5 hours at about 200~450° C.; putting the heated blank into the extrusion die, such as where an outer diameter of the extrusion die is 60~120 mm (e.g., 70 mm) and an inner diameter is 25~65 mm, e.g. 50 mm; and/or extruding the blank into the hollowed-out blank of uniform thickness, such as where one end of the hollowed-out blank is closed, an outer diameter is 25~65 mm (e.g., 50 mm) and an inner diameter is 10~55 mm (e.g., 40 mm). Of course, the hollowed-out blank may have an uneven wall thickness, such as in a range of 1.0-12 mm (e.g., 5.5 mm), and the hollowed-out blank may have two open ends. FIG. 1 illustrates a structure of the extruded blank.

Step S40 (e.g., fourth step, "blank preliminary shaping," etc.) involves putting the hollowed-out blank prepared in step S30 on the die; extruding the blank with the extrusion head to form a semi-finished blank; and/or lathing the external rough edges with a lathe. This step may also involve preserving the heat of the semi-finished blank for about 30 minutes at about 150~400° C. (e.g., 390° C.) and/or bending the semi-finished blank with a pipe bender, where after bending, the semi-finished blank has an included angle of 0~170°.

Step S50 (e.g., fifth step, "blank net shaping," etc.) involves putting the bent semi-finished blank prepared in step S40 in a super-plastic shaping die; heating the super-plastic shaping die to about 200~450° C.; closing the super-plastic shaping die; closing an air seal device; and slowly injecting argon into the semi-finished blank through the air inlet 3 at about 0.1 MPa~10 MPa, such as until the shell of the semi-finished blank fits the cavity of the water faucet die. The duration of shaping is about 3~35 minutes, after which the semi-finished product is produced. It is noted that the argon can be replaced with nitrogen, air, or with other media transmitting pressure. Further, the super-plastic shaping die includes an upper die and a lower die, where the upper die and the lower die combine to form a cavity, which is the structure of the bathroom hardware shell. The super-plastic shaping die includes the structures corresponding to the water faucet and the water inlet.

Figure 7:
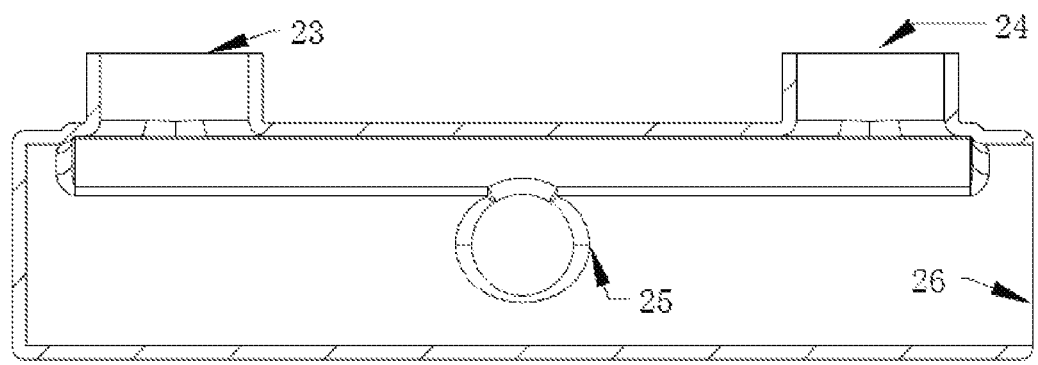
FIG. 7 is a cross sectional view of a bathroom hardware shell, such as the shell in Embodiment 2 of this application.

Step S60 (e.g., sixth step, "riser removal," etc.) involves removing the riser (e.g., corresponding to the position of the water inlet) of the semi-finished product prepared in step S50, such as with a lathe, i.e., the part 26 in FIG. 7. By way of example, the processing precision can be 0.05 mm.

Step S70 (e.g., seventh step, "mechanical processing," etc.) involves making a round hole with a diameter of about 32 mm at the position corresponding to the water faucet on the semi-finished product, whose riser is removed in step S60, i.e., the protrusions or parts 23 and 24 shown in FIG. 7, and/or making a round hole with a diameter of about 21 mm in the feature or part 25 shown in FIG. 7.

Step S80 (e.g., eighth step, "polishing," etc.) involves carrying out rough polishing, fine polishing, and/or cleaning to one or more surfaces of the semi-finished product processed in step S70. For example, the step can include sanding the semi-finished product, such as with 180-mesh, 400-mesh, and/or 600-mesh sanding belts. The rotational speed or frequency of the sanding belt wheel can be set in a range of 1,500~2,500 rpm. Also, for example, the step can include cleaning with a cloth wheel whose rotational speed or frequency is 1,500~2,500 rpm, such that the surface roughness of the semi-finished product is about Ra 2.0~0.5 μm.

Step S90 (e.g., ninth step, "surface treatment," etc.) involves plating a coating or coat (e.g., a copper coat, a nickel coat, a chromium coat, etc.) on the semi-finished product polished in step S80. By way of example, water-plating can apply the coating. The thickness of the copper coat can be 15~30 μm; the thickness of the nickel coat can be 10~25 μm; and the thickness of the chromium coat can be 0.1~0.4 μm, as examples.

It is noted that the order of describing the above embodiments is arranged for the convenience of description and doesn't represent the quality of embodiments. Finally, it should be noted that: the above embodiments are used to illustrate, rather than limit, the technical solutions in this invention. Although this invention is explained in detail with reference to the above embodiments, ordinary technicians in the field should understand that they can make modifications to the technical solutions in the above embodiments or make equivalent substitutions to some technical characteristics therein; these modifications or substitutions don't cause the essence of corresponding technical solutions go beyond the spirit and scope of the technical solutions in embodiments in this invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the methods and bathroom hardware shells as shown and described in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A method of producing bathroom or kitchen hardware shells, the method comprising:
    providing a bar having an outer diameter and a length;
    heating the bar to a first temperature for a first time;
    extruding the heated bar to form a hollow blank having a wall thickness;

forming a semi-finished blank by closing one end of the hollow blank;

bending the semi-finished blank to have an angle between first and second parts of the semi-finished blank;

placing the bent semi-finished blank in a bathroom hardware shell shaping die, wherein the bathroom hardware shell shaping die is heated to a second temperature;

forming a shell by injecting a gas onto or into the bent semi-finished blank, after closing the bathroom hardware shell shaping die, through a gas inlet in the bathroom hardware shell shaping die at a pressure for a second time, which causes the bent semi-finished blank to fit a cavity of the bathroom hardware shell shaping die;

removing the shell from the bathroom hardware shell shaping die and forming a water faucet hole therein; and plating an outer surface of the shell with a coating.

2. The method of claim 1, wherein bending the semi-finished blank to the angle is done at a third temperature.

3. The method of claim 2, further comprising one or more of the following after bending the semi-finished blank:

removing at least one fold on the bent semi-finished blank; and polishing a portion of the bent semi-finished blank where each fold was removed.

4. The method of claim 3, wherein polishing the portion of the bent semi-finished blank is carried out with a rotational speed in a range of 1500 rpm to 2500 rpm.

5. The method of claim 4, wherein an average roughness of the semi-finished blank after polishing has an average surface roughness in a range of 2.0 μm to 0.5 μm.

6. The method of claim 2, wherein the third temperature is in a range of 150 to 400° C. and the angle is between 0° and 170°.

7. The method of claim 2, wherein forming the semi-finished blank further comprises one or more of the following:

extruding the semi-finished blank with an extrusion head; and removing at least one external rough edge with a lathe.

8. The method of claim 1, further comprising connecting the shell to a metal base.

9. The method of claim 8, further comprising removing a riser of the shell prior to connecting the metal base to the shell and prior to forming the water faucet hole, wherein the water faucet hole has a diameter in a range of 8 to 35 mm.

10. The method of claim 8, wherein connecting the shell to the metal base is carried out using at least one of argon arc welding, laser welding, or braze welding.

11. The method of claim 1, wherein providing the bar comprises:

casting or extruding the bar such that the outer diameter is in a range of 25 to 65 mm, wherein the outer dimeter is larger than an inner diameter; and trimming the bar such that the length is in a range of 50 to 500 mm.

12. The method of claim 11, wherein the first time is in a range of 1.5 to 2.5 hours, the first temperature is in a range of 200 to 450° C., and the inner diameter is in a range of 10 to 55 mm.

13. The method of claim 1, wherein the coating comprises at least one of a copper coat having a thickness in a range of 15 to 30 μm, a nickel coat having a thickness in a range of 10 to 25 μm, and a chromium coat having a thickness in a range of 0.1 to 0.4 μm.

14. The method of claim 13, wherein the coating is applied by water plating.

15. The method of claim 1, wherein the gas is argon, the pressure is in a range of 0.1 to 101V1 Pa, and the second time is in a range from 3 to 35 minutes.

16. The method of claim 15, wherein forming the shell by injecting the argon gas onto or into the bent semi-finished blank comprises:

injecting the argon gas, wherein the pressure is in a range of 0.1 to 2 Mpa for 2 to 8 minutes;

then injecting the argon gas, wherein the pressure is in a range of 0.5 to 5 Mpa for 2 to 15 minutes; and then injecting the argon gas, wherein the pressure is in a range of 0.8 to 10 Mpa for 3 to 25 minutes.

17. The method of claim 1, wherein the bar comprises a zinc alloy, a zinc-aluminum alloy, or an aluminum alloy.

18. The method of claim 1, wherein the gas comprises at least one of nitrogen and air.

* * * * *